United States Patent
Ramasamy

(10) Patent No.: US 10,756,414 B2
(45) Date of Patent: Aug. 25, 2020

(54) SYSTEM AND METHOD FOR OPERATING A LIVING ANTENNA APERTURE MECHANISM

(71) Applicant: Dell Products, LP, Round Rock, TX (US)

(72) Inventor: Suresh K. Ramasamy, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 147 days.

(21) Appl. No.: 15/801,617

(22) Filed: Nov. 2, 2017

(65) Prior Publication Data
US 2019/0131688 A1   May 2, 2019

(51) Int. Cl.
*H01Q 1/22*    (2006.01)
*H01Q 1/24*    (2006.01)
(Continued)

(52) U.S. Cl.
CPC ......... *H01Q 1/2266* (2013.01); *G06F 1/1616* (2013.01); *G06F 1/1681* (2013.01); *H01Q 1/243* (2013.01); *H01Q 3/06* (2013.01); *H04B 1/3838* (2013.01); *H01Q 1/2291* (2013.01); *H01Q 13/10* (2013.01)

(58) Field of Classification Search
CPC .... G06F 1/1616; G06F 1/1698; G06F 1/1656; G06F 1/1618; G06F 1/1681; G06F 1/16; H01Q 1/22; H01Q 1/2266; H01Q 21/08; H01Q 13/02; H01Q 13/10; H01Q 1/084; H01Q 1/2258; H01Q 1/24; H01Q 1/242; H01Q 1/243; H01Q 1/38; H01Q 1/50; H01Q 21/10; H01Q 21/205; H01Q 21/30; H01Q 3/01; H01Q 3/02; H01Q 3/14; H01Q 3/20; H01Q 3/242; H01Q 3/26; H01Q 5/371; H01Q 9/0421; Y10S 248/917; Y10T 29/49002
See application file for complete search history.

(56) References Cited

U.S. PATENT DOCUMENTS 5,469,181 A    11/1995  Yarsunas
5,507,013 A *  4/1996  Weadon .............. H04M 1/0216
                                                  16/257
(Continued)

FOREIGN PATENT DOCUMENTS

WO    2017/122851 A1    7/2017

*Primary Examiner* — Tho G Phan
(74) *Attorney, Agent, or Firm* — Prol Intellectual Property Law, PLLC; H. Kenneth Prol

(57) ABSTRACT

A hinge for an information handling system and method for operating a hinge including an antenna feed operatively connected to a wireless adapter for communicating on a wireless link with the hinge pivoting between a display housing and a second housing and the hinge operable to provide for rotation of the display housing around the hinge with respect to the second housing between usage mode configurations. The antenna feed terminating in the hinge, wherein the hinge is movable with respect to a plurality of antenna apertures and the hinge includes the plurality of antenna apertures each alignable to the antenna feed depending on the rotation orientation of the display housing around the hinge with respect to the second housing to couple to the antenna feed in the usage mode configuration positions.

20 Claims, 5 Drawing Sheets

(51) Int. Cl.
  *G06F 1/16* (2006.01)
  *H04B 1/3827* (2015.01)
  *H01Q 3/06* (2006.01)
  *H01Q 13/10* (2006.01)

(56) References Cited

U.S. PATENT DOCUMENTS

| | | |
|---|---|---|
| 6,300,910 B1 * | 10/2001 | Kim .................. H01Q 1/084 |
| | | 343/702 |
| 6,531,985 B1 | 3/2003 | Jones |
| 7,342,540 B2 | 3/2008 | Nahar |
| 7,733,276 B2 | 6/2010 | Levy |
| 8,310,825 B2 | 11/2012 | Schlesener |
| 8,441,783 B2 * | 5/2013 | Tanaka .................. G06F 1/1616 |
| | | 16/250 |
| 9,036,339 B2 | 5/2015 | Schlesener |
| 9,318,791 B2 * | 4/2016 | Leonard .............. H01Q 1/2266 |
| 9,350,068 B2 * | 5/2016 | Guterman .............. H01Q 9/42 |
| 9,917,347 B2 | 3/2018 | Bologna |
| 10,033,087 B2 * | 7/2018 | Sultenfuss ........... H01Q 1/2266 |
| 10,446,908 B2 * | 10/2019 | Bologna .............. H01Q 1/2266 |
| 2012/0026048 A1 | 2/2012 | Vazquez |
| 2016/0056537 A1 | 2/2016 | Guler |
| 2018/0040940 A1 | 2/2018 | Bologna |

* cited by examiner

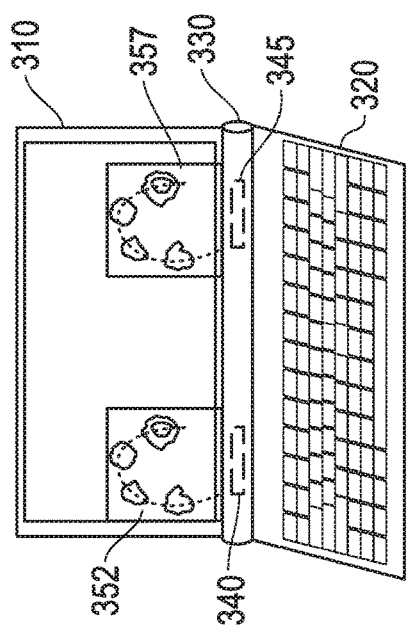
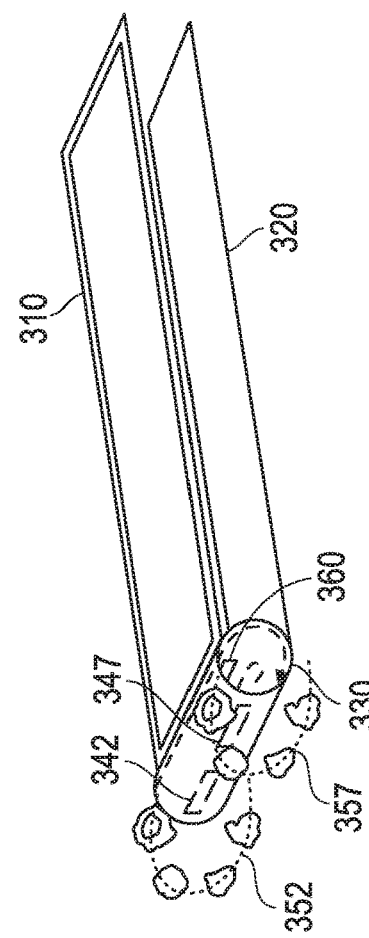
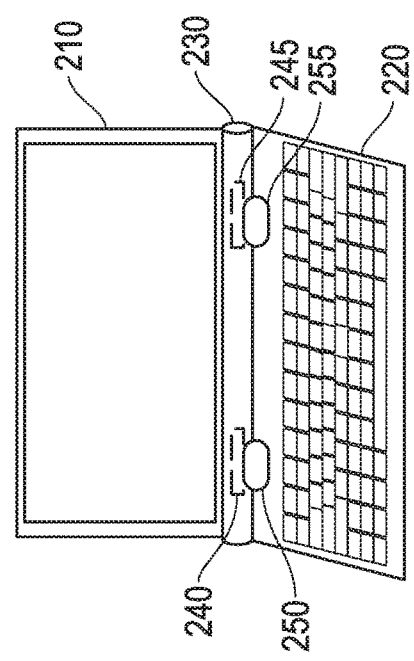
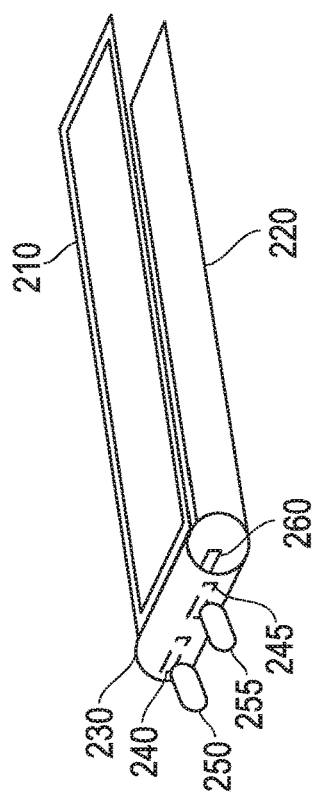

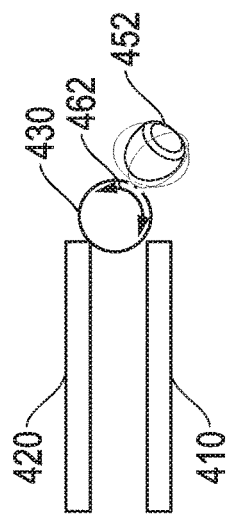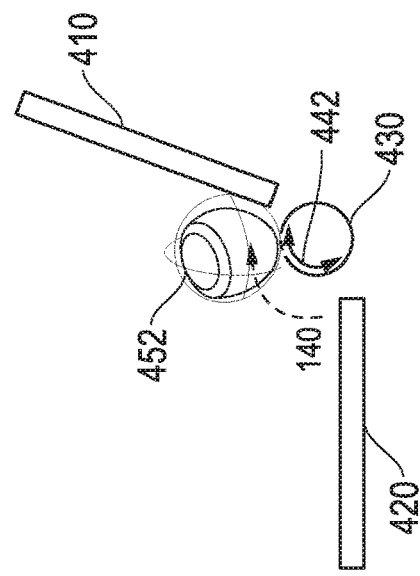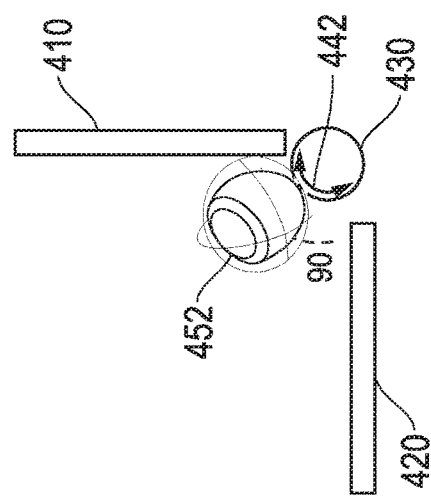

US 10,756,414 B2

SYSTEM AND METHOD FOR OPERATING A LIVING ANTENNA APERTURE MECHANISM

FIELD OF THE DISCLOSURE

The present disclosure generally relates to a method and apparatus for a living antenna aperture mechanism for one or a plurality of radio antenna systems used with information handling systems.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures. Data communications among information handling systems may be via networks that are wired, wireless, optical or some combination. For wireless communications, one or more wireless interface adapters may be used including antenna systems, a front end antenna module and other radio frequency subsystems. Users may choose from among several available radiofrequency communication platforms in information handling systems for data and other communications with other users via communication and data networks.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 2A is a graphical diagram of a mobile information handling system showing a hinge antenna aperture configuration according to an embodiment of the present disclosure;

FIG. 2B is a graphical diagram of a mobile information handling system showing a hinge antenna aperture configuration according to another embodiment of the present disclosure;

FIG. 3A is a graphical diagram of a mobile information handling system showing a hinge living antenna aperture in a configuration according to an embodiment of the present disclosure;

FIG. 3B is a graphical diagram of a mobile information handling system showing a hinge living antenna aperture in a configuration according to another embodiment of the present disclosure;

FIG. 4A is a cross section graphical diagram of a mobile information handling system showing a hinge living antenna aperture in a usage mode configuration according to an embodiment of the present disclosure;

FIG. 4B is a cross section graphical diagram of a mobile information handling system showing a hinge living antenna aperture in another usage mode configuration according to an embodiment of the present disclosure;

FIG. 4C is a cross section graphical diagram of a mobile information handling system showing a hinge living antenna aperture in yet another usage mode configuration according to an embodiment of the present disclosure;

DETAILED DESCRIPTION OF THE DRAWINGS

Figure 1:
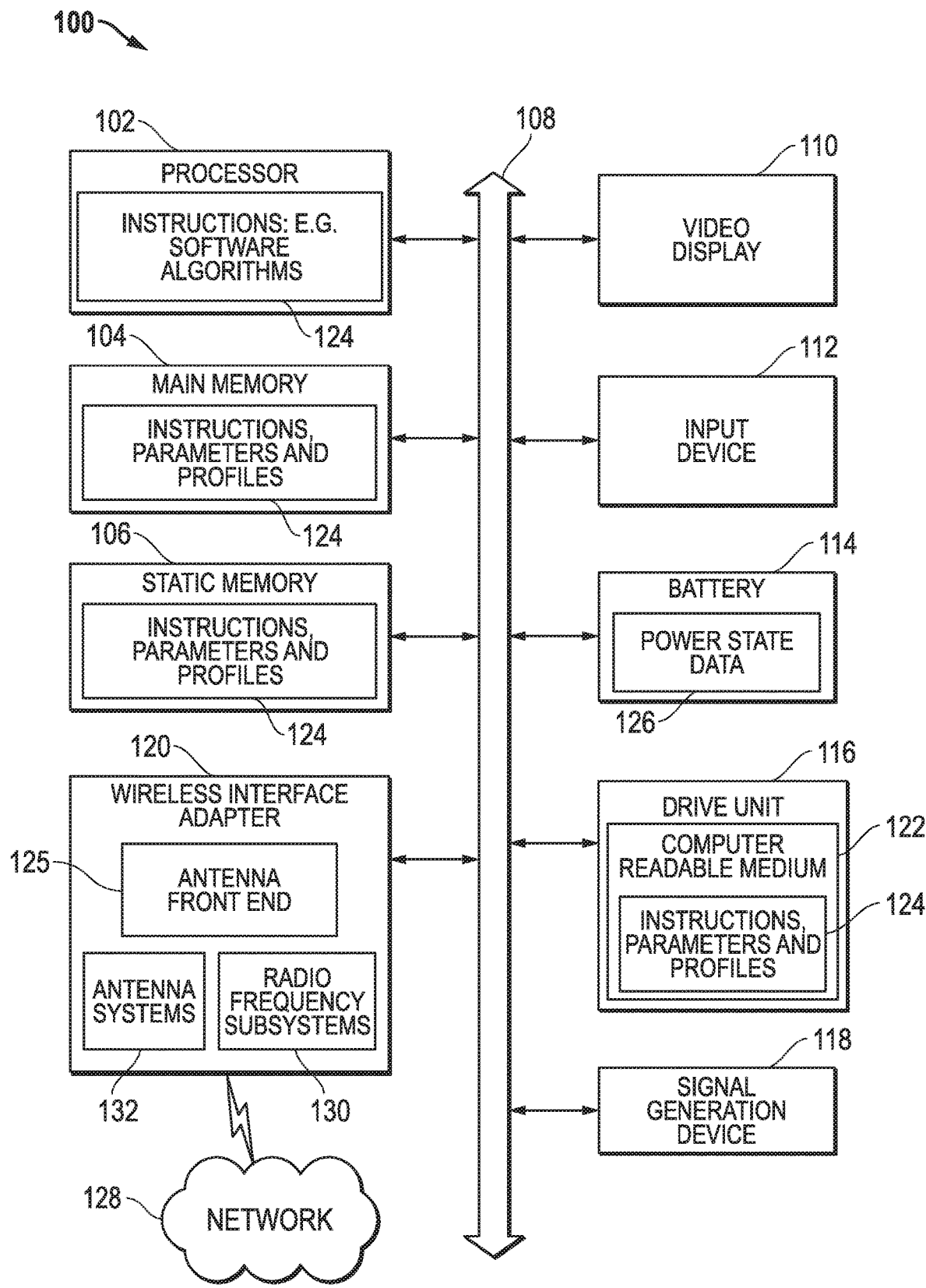
FIG. 1 is a block diagram illustrating an information handling system according to an embodiment of the present disclosure.

The following description in combination with the Figures is provided to assist in understanding the teachings disclosed herein. Aspects within the Figures are not necessarily drawn to scale and may be estimations of position and size for purposes of explanation of various embodiments herein. The description is focused on specific implementations and embodiments of the teachings, and is provided to assist in describing the teachings. This focus should not be interpreted as a limitation on the scope or applicability of the teachings.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system may be of a variety of models and types. For example, a personal computer may be a laptop, a 360 convertible computing device, a tablet, smart phone, wearable computing device, a dual housing convertible tablet computing device, or other mobile information handling system and may have several configurations and orientation modes. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. In an aspect, the information handling system may have a plurality of antenna systems for communication via wireless links operating on a variety of radio access technologies (RAT). In another aspect, several antenna systems may be available for each RAT to enable aggregated data communications such as via plural multiple in, multiple out (MIMO) streams to enhance bandwidth or reliability. Antenna systems may be operated via one or more wireless adapters that may include controllers, memory and other subsystems some of which may operate as a radio frequency (RF) front end for one or more antenna systems to transmit wirelessly. Portions of an information handling system may themselves be considered information handling systems.

In some types of convertible information handling systems, a plurality of housings may be connected by a hinge structure enabling reconfiguration of the convertible information handling systems into a plurality of usage mode configurations. For example, a convertible laptop system may have a housing for a display and a housing for a keyboard which may be rotated around a hinge structure to provide for a laptop usage mode configuration and a tablet usage mode configuration in an embodiment. Further, other configurations may be available for the convertible laptop information handling system including options on the laptop usage mode, a tent mode, or other table usage mode configurations. In other embodiments, the convertible information handling system may include two housings which may support a single, bendable display screen or a plurality of display screens. The housings again may be operatively connected via a hinge such that the housings may rotate around the hinge with respect to one another for various usage mode configurations of the display screen or display screens including a laptop configuration, dual tablet, single tablet, tent mode, easel mode, book mode, as well as other usage mode configurations. In many instances, it is aesthetically desirable for the convertible information handling system to have housings with a metal cover, sometimes referred to as an A-cover, having no break in the metal cover for antenna systems as may be required for some antenna systems mounted in the A-cover. Further, thin metal housings are desirable in some circumstances as well. A convertible information handling system may have antenna apertures mounted in the hinge mechanism in some embodiments to provide for transceiving antenna operation and yield a thinner device with adaptable antenna transmission patterns.

Traditional aperture antennas are fixed such that radiation pattern or mode and specific absorption rate (SAR) hotspots are fixed with respect to the location of the antenna aperture. In such an instance, the antenna aperture radiation pattern is limited in adaptations to its radiation pattern. As such, adaptation to radiofrequency transmission radiation patterns is unavailable or limited. An adaptable radiofrequency transmission radiation pattern may provide an effective feature for minimizing losses against a user touching the information handling system, reducing SAR exposure, and may even assist in changing the radiation pattern to avoid a need for substantial power cutbacks to meet SAR regulatory requirements. In various embodiments herein, a living antenna aperture may be provided in a hinge mechanism for a convertible information handling system. The living antenna aperture provides for multiple antenna aperture options which may be engaged for radiofrequency coupling to an antenna feed as the hinge is rotated during reconfiguration of the convertible information handling system.

FIG. 1 shows an information handling system 100 capable of administering each of the specific embodiments of the present disclosure. The information handling system 100 can represent the mobile information handling systems or servers or systems located anywhere within wireless network, including the remote data centers operating virtual machine applications. Information handling system 100 may represent a mobile information handling system associated with a user or recipient of intended wireless communication. A mobile information handling system may execute instructions via a processor for an antenna optimization system including concurrent wireless link utilization according to embodiments disclosed herein. The application programs communicating or otherwise operating via concurrently wireless links may operate in some example embodiments as software, in whole or in part, on a mobile information handling system while other portions of the software applications may operate on remote server systems. The antenna optimization system of the presently disclosed embodiments may operate as firmware, software, or hardwired circuitry or any combination on controllers or processors within the information handling system 100 or some of its components such as a wireless interface adapter 120. Information handling system 100 may also represent a networked server or other system and administer aspects of the antenna optimization system via instructions executed on a processor according to various embodiments herein involving remote operation of such systems. The information handling system 100 may include a processor 102 such as a central processing unit (CPU), a graphics processing unit (GPU), or both. Moreover, the information handling system 100 can include a main memory 104 and a static memory 106 that can communicate with each other via a bus 108. As shown, the information handling system 100 may further include a video display unit 110, such as a liquid crystal display (LCD), an organic light emitting diode (OLED), a flat panel display, a solid state display, or a cathode ray tube (CRT). In some embodiments, a plurality of video display units 110 may be utilized. Display 110 may include a touch screen display module and touch screen controller (not shown) for receiving user inputs to the information handling system 100. Touch screen display module may detect touch or proximity to a display screen by detecting capacitance changes in the display screen as understood by those of skill. Additionally, the information handling system 100 may include an input device 112, such as a keyboard, and a cursor control device, such as a mouse or touchpad or similar peripheral input device. The information handling system may include a power source such as battery 114 or an A/C power source. The information handling system 100 can also include a disk drive unit 116, and a signal generation device 118, such as a speaker or remote control. The information handling system 100 can include a network interface device such as a wireless adapter 120. The information handling system 100 can also represent a server device whose resources can be shared by multiple client devices, or it can represent an individual client device, such as a desktop personal computer, a laptop computer, a tablet computer, a 360 degree convertible device such as a convertible laptop or convertible double tablet, a wearable computing device, or a mobile smart phone.

The information handling system 100 can include a set of instructions 124 that can be executed to cause the computer system to perform any one or more of the methods or computer based functions disclosed herein. For example, instructions 124 may software applications which utilize one or more wireless links for wireless communications via the wireless interface adapter as well as other aspects or components. Similarly instructions 124 may be executed as antenna optimization system disclosed herein for monitoring wireless links and adjusting wireless antenna systems and resources although in some aspects the antenna optimization system may operate as firmware on a controller within the wireless interface device 120. Instructions 124 may also include aspects of the antenna optimization system as part of an antenna front end 125 described in the present disclosure and operating as firmware or software to remedy or adjust one or more of a plurality of antenna systems 132 via selecting wireless link communication frequency band channels, adjusting power levels to cutback to meet SAR regulatory requirements, or other adjustments. Adjustments may be made for multiple antenna systems operating on various communication frequency bands to avoid interference due to nearness of transmission or reception due to nearness of frequency channels or due to physical proximity of the antenna systems among other factors in some aspects. In other aspects instructions 124 may execute algorithms to regulate operation of the one or more antenna systems 132 in the information handling system 100 to avoid poor wireless link performance due to potential effects of interference from nearby antenna operation, both physically and in frequency of wireless link channels used as well as due to impedance mismatching or other factors.

Various software modules comprising software application instructions 124 or firmware instructions may be coordinated by an operating system (OS) and via an application programming interface (API). An example operating system may include Windows®, Android®, and other OS types known in the art. Example APIs may include Win 32, Core Java API, or Android APIs. In a further example, processor 102 may conduct monitoring and processing of mobile information handling system usage trends by the information handling system 100 according to the systems and methods disclosed herein. The computer system 100 may operate as a standalone device or may be connected such as using a network, to other computer systems or peripheral devices.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a PDA, a mobile information handling system, a tablet computer, a laptop computer, a desktop computer, a communications device, a wireless smart phone, wearable computing devices, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 116 may include a computer-readable medium 122 in which one or more sets of instructions 124 such as software can be embedded. Similarly, main memory 104 and static memory 106 may also contain computer-readable medium for storage of one or more sets of instructions, parameters, or profiles 124. The disk drive unit 116 and static memory 106 also contains space for data storage. Further, the instructions 124 may embody one or more of the methods or logic as described herein. For example, instructions relating to the antenna optimization system algorithms or antenna adjustment policies described in embodiments herein may be stored here or transmitted to local memory located with the antenna front end 125 in the wireless interface adapter 132.

In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the applications program instructions 124 may be executed locally or remotely. The main memory 104 and the processor 102 also may include computer-readable media. Battery 114 may include a smart battery system that tracks and provides power state data 126. This power state data may be stored with the instructions, parameters, and profiles 124 to be used with the systems and methods disclosed herein.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include one or more radio frequency subsystems 130 with transmitter/receiver circuitry, modem circuitry, one or more unified radio frequency front end circuits, one or more wireless controller circuits, amplifiers, antenna systems 132 and other radio frequency subsystem circuitry 130 for wireless communications via multiple radio access technologies. Each radiofrequency subsystem 130 may communicate with one or more wireless technology protocols. The radiofrequency subsystem 130 may contain individual subscriber identity module (SIM) profiles for each technology service provider and their available protocols for subscriber based radio access technologies such as cellular LTE communications. The wireless adapter 120 may also include antenna systems 132 which may be tunable antenna systems for use with the system and methods disclosed herein. Additional antenna system modification circuitry (not shown) may also be included with the wireless interface adapter 120 to implement coexistence control measures as described in various embodiments of the present disclosure.

In some aspects of the present disclosure, one wireless adapter 120 may operate two or more wireless links. In a further aspect, the wireless adapter 120 may operate the two or more wireless links with a single, shared communication frequency band such as with the 5G standard relating to unlicensed wireless spectrum for small cell 5G operation or for unlicensed Wi-Fi WLAN operation in an example aspect. For example, a 5 GHz wireless communication frequency band may be apportioned under the 5G standards for communication on either small cell WWAN wireless link operation or Wi-Fi WLAN operation. In some embodiments, the shared, wireless communication band may be transmitted through one or a plurality of antennas. Any number of antenna systems 132 may be utilized and a variety of wireless protocols used according to various embodiments herein. Other shared communication frequency bands are contemplated for use with the embodiments of the present disclosure as well.

In other aspects, the information handling system 100 operating as a mobile information handling system may operate a plurality of wireless adapters 120 for concurrent radio operation in one or more wireless communication bands. The plurality of wireless adapters 120 may further share a wireless communication band or operate in nearby wireless communication bands in some disclosed embodiments. Further, harmonics and other effects may impact wireless link operation when a plurality of wireless links are operating concurrently as in some of the presently described embodiments requiring antenna transmission adjustments. Additionally, SAR regulatory requirements may adjust or require adjustments to operation of antenna systems 132 and power cutback adjustments may be made via one or more of the plurality of wireless adapters 120.

The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers which may operate in both license and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are propriety but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well. In the example embodiment, mobile information handling system 100 includes both unlicensed wireless radio frequency communication capabilities as well as licensed wireless radio frequency communication capabilities. For example, licensed wireless radio frequency communication capabilities may be available via a subscriber carrier wireless service. With the licensed wireless radio frequency communication capability, WWAN RF front end may operate on a licensed WWAN wireless radio with authorization for subscriber access to a wireless service provider on a carrier licensed frequency band.

The wireless adapter 120 can represent an add-in card, wireless network interface module that is integrated with a main board of the information handling system or integrated with another wireless network interface capability, or any combination thereof. In an embodiment the wireless adapter 120 may include one or more radio frequency subsystems 130 including transmitters and wireless controllers for connecting via a multitude of wireless links. In an example embodiment, an information handling system may have an antenna system transmitter 132 for 5G small cell WWAN, Wi-Fi WLAN or WiGig connectivity and one or more additional antenna system transmitters 132 for macro-cellular communication. The radio frequency subsystems 130 include wireless controllers to manage authentication, connectivity, communications, power levels for transmission, buffering, error correction, baseband processing, and other functions of the wireless adapter 120.

The radio frequency subsystems 130 of the wireless adapters may also measure various metrics relating to wireless communication pursuant to operation of the antenna systems 132 as in the present disclosure. For example, the wireless controller of a radio frequency subsystem 130 may manage detecting and measuring received signal strength levels, bit error rates, signal to noise ratios, latencies, jitter, and other metrics relating to signal quality and strength. In one embodiment, a wireless controller of a wireless interface adapter 120 may manage one or more radio frequency subsystems 130. The wireless controller also manages transmission power levels which directly affect radio frequency subsystem power consumption as well as transmission power levels from the plurality of antenna systems 132. The transmission power levels from the antenna systems 132 may be relevant to specific absorption rate (SAR) safety limitations for transmitting mobile information handling systems. To control and measure power consumption via a radio frequency subsystem 130, the radio frequency subsystem 130 may control and measure current and voltage power that is directed to operate one or more antenna systems 132.

The wireless network may have a wireless mesh architecture in accordance with mesh networks described by the wireless data communications standards or similar standards in some embodiments but not necessarily in all embodiments. The wireless adapter 120 may also connect to the external network via a WPAN, WLAN, WWAN or similar wireless switched Ethernet connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the network 128. Further, the instructions 124 may be transmitted or received over the network 128 via the network interface device or wireless adapter 120.

Information handling system 100 includes one or more application programs 124, and Basic Input/Output System and firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in drive 116, in a ROM (not illustrated) associated with information handling system 100, in an option-ROM (not illustrated) associated with various devices of information handling system 100, in storage system 107, in a storage system (not illustrated) associated with network channel of a wireless adapter 120, in another storage medium of information handling system 100, or a combination thereof. Application programs 124 and BIOS/FW code 124 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

FIG. 2A illustrates a convertible information handling system including a first display housing 210 and a second housing 220 operatively connected via hinge 230 in an example embodiment. In an example aspect, the hinge 230 is shown including antenna apertures 240 and 245 mounted therein and having a fixed antenna radiation pattern 250 and 255 respectively according to an aspect of the present disclosure. The example of FIG. 2A shows the hinge embedded antenna apertures 240 and 245 to provide for a thinner information handling system device, however the shown antenna apertures 240 and 245 are fixed and limited to adapt the respective antenna radiation patterns 250 and 255 upon rotation of the first display housing 210 relative to the second housing 220 around hinge 230 except with respect to rotation of antenna apertures 240 and 245. In an embodiment, the first display housing 210 may include a display screen, and the second housing 220 may support a keyboard for a convertible laptop information handling system. In other embodiments, the first display housing 210 may include a flexible display screen supported also over the second housing 220 for a convertible double-tablet information handling system. In yet other embodiments, the first display housing 210 may include a display screen, and the second housing 220 may support a second display screen for a convertible double-tablet information handling system. FIG. 2A depicts a hinge rotation position for a laptop usage mode configuration in one example embodiment.

FIG. 2B shows the convertible information handling system after the first display housing 210 and a second housing 220 are rotated around hinge 230 into a second usage mode configuration. FIG. 2B depicts a tablet usage mode configuration in an example embodiment. The convertible information handling system in the tablet usage mode additionally shows antenna apertures 240 and 245 with respective antenna radiation patterns 250 and 255. Additional detail of hinge 230 is shown including the coupled feed 260 located inside a cavity of the hinge mechanism 230 for supplying radiofrequency signal or receiving radiofrequency signal via the antenna apertures 240 and 245 located on the hinge 230. As shown, antenna apertures 240 and 245 being fixed in hinge 230 to adapt the respective antenna radiation pattern 250 and 255 which remain fixed in pattern orientation with respect to the location of antenna apertures 240 and 245 on hinge 230 through rotation. The hinge has been rotated into a new usage mode configuration of the convertible information handling system and the antenna radiation pattern locations 250 and 255 are fixed due to fixed aperture, with radiation pattern directivity altered somewhat as the first display housing rotates away from the second housing with respect to the configuration of the convertible information handling system.

FIG. 3A illustrates a convertible information handling system including a first display housing 310 and a second housing 320 operatively connected via hinge 330 having a plurality of antenna apertures in an example embodiment of the present disclosure. In an example aspect, the hinge 330 is shown including antenna apertures 340 and 345 mounted therein but having a variable antenna radiation pattern 352 and 357 respectively as the hinge 330 is opened or closed around a pivot angle between the first display housing 310 and the second housing 320 according to an aspect of the present disclosure. The example of FIG. 3A shows the effect of multiple hinge embedded antenna apertures would have on the respective antenna radiation patterns 352 and 357 upon rotation of the first display housing 310 relative to the second housing 320 around hinge 330. Nonetheless, FIG. 3A depicts a hinge rotation position for a laptop usage mode configuration in one example embodiment.

FIG. 3B shows the convertible information handling system after the first display housing 310 and a second housing 320 are rotated around hinge 330 into a second usage mode configuration. FIG. 3B depicts a tablet usage mode configuration in an example embodiment. The convertible information handling system in the tablet usage mode additionally shows additional antenna apertures 342 and 347 in an embodiment that are different from antenna apertures 340 and 345 on hinge as shown in FIG. 3A. The respective antenna radiation patterns 352 and 357 show the effect of hinge 330 rotation across the plural aperture. As the hinge 330 rotates so do the antenna radiation patterns 352 and 357 as an antenna feed shifts from antenna apertures 340 and 345 to antenna apertures 342 and 347.

Additional detail of hinge 330 is shown including the coupled feed 360 located inside a cavity of the hinge mechanism 330 for supplying radiofrequency signal or receiving radiofrequency signal. As coupled feed 360 is rotated inside the cavity of hinge 330 between coupling to antenna aperture 347 from antenna aperture 345, the antenna radiation pattern 357 also shifts to provide for an antenna radiation pattern adapted to the new usage mode configuration. As shown, antenna apertures 340 and 345 are not fixed aperture selections in hinge 330 with respect to the antenna feeds, such as 360, but are able to adapt the respective antenna radiation pattern 352 and 357 shift pattern orientation with respect to engagement with additional antenna apertures 342 and 347 on hinge 330 although the hinge has been rotated into a new usage mode configuration of the convertible information handling system.

FIG. 4A, FIG. 4B, and FIG. 4C show a cross-section of a convertible information handling system including a first display housing 410 and a second housing 420 with a hinge 430 operatively connecting them. FIG. 4A shows a laptop usage mode configuration where the first display housing 410 is at a 90 degree angle to the second housing 420. Antenna aperture 442 is positioned such that variable antenna radiation pattern 452 is in a first position. FIG. 4B shows the laptop usage mode configuration where the first display housing 410 is at a 140 degree angle to the second housing 420. Antenna aperture 442 is positioned such that variable antenna radiation pattern 452 is in a second position shifted from the first position with the rotation of the hinge 430. In the case of FIG. 4B, the antenna aperture 442 may move with the rotation of the hinge from position at 90 degrees to 140 degrees in an embodiment and the antenna radiation pattern 452 shifts as well.

FIG. 4C shows the tablet usage mode configuration where the first display housing 410 is rotated around behind the second housing 420. A second antenna aperture 462 on hinge 430 is engaged to position the variable antenna radiation pattern 452 is in a position shifted from both the first position and second position with the rotation of the hinge 430 in some embodiments. The position of variable antenna radiation pattern 452 in the tablet usage mode configuration of FIG. 4C is shifted away from the user to provide for improvement of the potential SAR exposure and possible to improve wireless signal conditions for the antenna feed (not shown) coupled to antenna aperture 462.

In a variation example of the hinge 430 shown in FIGS. 4A-C, a single aperture 442 that may be rotated about the hinge structure 430 to a second position 462. The single aperture 442 may rotate at a rate the same or differently from that of the hinge to allow for adaptive adjustment to the antenna radiation pattern 452. This may occur in a 1:1 correspondence of rotation between the hinge and aperture 442 in some embodiments. In other embodiments of a variation on FIGS. 4A-C, aperture 442 may rotate on a barrel structure that rotates at a different rotation amount from the hinge 430. This differing rotation, either additional rotation or less rotation depending on reconfiguration between usage modes, will cause an adaptation to the antenna transmission pattern 452. Relocation of the antenna aperture between positions 442 and 462 with respect to the convertible information handling system in different usage mode configurations yields an adjusted antenna aperture transmission pattern 452.

Figure 5C:
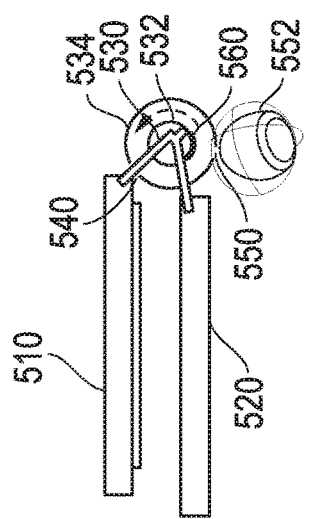
FIG. 5C is a graphical diagram of a mobile information handling system showing a hinge fixed feed structure coupling to the living antenna aperture in another usage mode configuration according to an embodiment of the present disclosure.
Figure 5B:
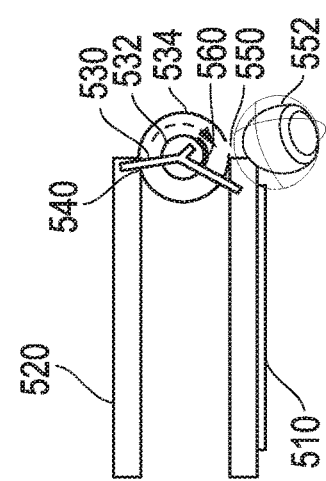
FIG. 5B is a graphical diagram of a mobile information handling system showing a hinge fixed feed structure coupling to the living antenna aperture in another usage mode configuration according to an embodiment of the present disclosure.
Figure 5D:
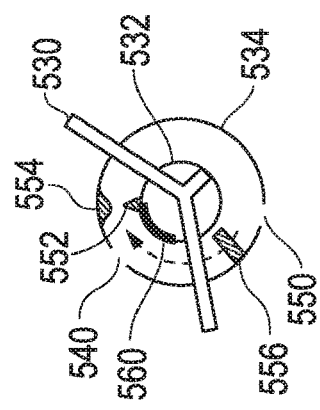
FIG. 5D is another graphical diagram of a mobile information handling system showing closer detail of a hinge fixed feed structure coupling to the living antenna aperture in changing configuration according to an embodiment of the present disclosure.
Figure 5A:
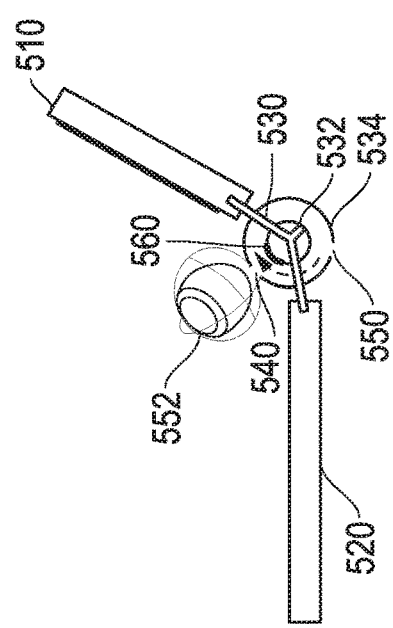
FIG. 5A is a graphical diagram of a mobile information handling system showing a hinge fixed feed structure coupling to the living antenna aperture in a usage mode configuration according to an embodiment of the present disclosure.

FIGS. 5A, 5B, 5C and 5D show the hinge detail of a convertible information handling system according to an embodiment of the present disclosure. FIG. 5A shows a convertible information handling systems in an open position for a laptop usage mode configuration. Hinge 530 is shown behind a hinge cavity of an outer barrel 534, also referred to as an outer barrel cavity. For illustration purposes, hinge 530 is shown in cross section along with outer barrel 534 to show relationship of rotational operation with the outer barrel 534. A shaft or carrier 532 may project from hinge 530 to the cavity within outer barrel 534 and to which antenna feed 560 may be attached. Antenna feed 560 on shaft or carrier 532 may thus rotate within barrel 534 and slidingly adjust in alignment between a plurality of antenna apertures 540 and 550 in barrel 534. It is understood that although barrel 534 is shown as cylindrical, any cross sectional shape may be used including an oval shape, or any polygonal shape of the barrel 534.

Hinge 530 may be open to approximately a 120 degree hinge position angle in an example embodiment of a laptop usage mode configuration in an embodiment. It is understood that a laptop hinge position angle may range from 90 degrees to 140 degrees in some example embodiments. It is understood that other hinge angle position ranges may be used to describe usage mode configuration positions including laptop configuration usage mode in other embodiments. Outer barrel 534 may be made of any conductive material. For example, outer barrel 534 may be made of aluminum. Outer barrel 534 may include one or a plurality of antenna apertures 540 and 550, such as a slot or opening in the barrel 534, that is tuned to the lowest frequency of operation for the wireless transmission or reception via a wireless adapter in the convertible information handling system. Two antenna apertures 540 and 550 are shown in the present embodiment of FIG. 5A, however any plurality of antenna apertures is contemplated for multiple usage mode configurations which may be achieved at different hinge positions. For example, a plurality of antenna apertures may be utilized for a laptop usage mode if there are hinge positions for such a usage mode at 100 degrees and 130 degrees in an example embodiment. In other embodiments, a tablet usage mode may have a corresponding antenna aperture 550 at a hinge position angle of 340-360 degrees. In some cases, multiple usage mode configurations may share antenna apertures or may have separate antenna apertures.

Hinge 530 includes a leaf-connected first display housing portion for operative connectivity of the hinge to the first display housing 510. In an example embodiment, first display housing 510 may support an LCD, OLED, or other display screen. Hinge 530 also includes a leaf-connected second housing portion for operative connectivity of the hinge to the second housing 520. In some embodiments, second housing 520 may support a keyboard as well as house processors, memory, and wireless adapter electronics in some embodiments. In another example embodiment, second display housing 520 may support a flexible display screen across both housings or a second display screen in various embodiments. The leaf-connected first housing portion and leaf-connected second housing portion may rotate with respect to one another to provide for a hinge actuation of the first display housing 510 with respect to the second display housing 520 around an axis of rotation of hinge 530. Rotation of the first display housing 510 with respect to the second display housing 520 around an axis of rotation of hinge 530 may reconfigure the convertible information handling system between usage mode configuration positions.

FIG. 5D shows a magnified version of the hinge 530 in a laptop usage mode hinge position angle for that shown in FIG. 5A. Inside the hinge cavity, one or more antenna feeds 560 may be provided such as for MIMO operation. In the cross-section example of FIG. 5A and FIG. 5D only one antenna feed 560 is shown. Antenna feed 560 may be operatively connected to a radiofrequency front end of a wireless adapter from either or both the first display housing 510 or the second display housing 520. The antenna feed 560 may be a termination for an RF signal connection to an RF front end of a wireless adapter for reception or transmission of RF signals according to a variety of wireless protocols and at a variety of potential frequency bands as described in embodiments herein. The antenna feed 560 may be a radiating element tuned to an odd or even harmonic of a fundamental frequency, such as a lowest operating frequency for the aperture or slot, such as 540 and 550. Antenna feed 560 may have a radiating element attached to a shaft or carrier 532 inside the hinge cavity of barrel 534 which may rotate as hinge 530 rotates around an axis of rotation as depicted in FIG. 5A. In an example embodiment, shaft or carrier 532 which rotates with rotation of hinge 530 may be made of plastic or other non-conductive material to minimize parasitic interference.

Shaft or carrier 532 may rotate along with hinge 530 in a 1:1 correspondence along the same axis of rotation of hinge 530 in some example embodiments. In other embodiments the rotation of shaft or carrier 532 may be modified either way away from a 1:1 rotation with the hinge rotation to adjust the angle of the radiating element 560 with respect to apertures 540 and 550 in outer barrel 534. In yet another example embodiment, the rotation of shaft or carrier 532 may lock into position as the hinge 530 is rotated between usage modes to lock in the radiating portion of the antenna feed 560 in position to couple with apertures 540 and 550 in outer barrel 534. The locking system may include a locking alignment guide 552 such as extensions or notches used in the rotation of carrier or shaft 532 to allow carrier or shaft 532 to set into a position to slidingly aligned with aperture 540 or 550 when rotated within barrel 534 in an example embodiment. The locking alignment guides 552 may engage in various levels of engagement with the outer barrel 534 at engagement positioners 554 or stopping positioners 556.

Locking alignment guide 552, engagement positioners 554, and stopping positioners 556 are not necessarily shown to scale in FIG. 5D and various levels of locking engagement may be used as understood thus affecting the size or shape of the locking alignment guide 552 and related elements. In some embodiments, the locking alignment guide 552 may be on the outer barrel 534 and positioners 554 and 556 on the carrier or shaft 532. Other variations to these embodiments are contemplated and understood to operate as an alignment mechanism for the apertures. Locking engagement may be an engagement that clicks into place or a system that provides resistance at an alignment point. In other embodiments, hinge 530 may have extensions, notches engagement positioners or other stopping positioners (not shown) as locking alignment guides that engage at certain hinge position angles for usage mode configuration to align antenna feed 560 with any of the plurality of apertures such as 540 and 550. Sliding alignment of radiation portion of antenna feed termination 560 may or may not physically engage outer barrel 534 in various embodiments. In the shown example embodiment, the antenna feed 560 does not slidingly engage, but only slidingly aligns with apertures 540 and 550 within outer barrel 534. In other embodiments, a sliding engagement between antenna feed 560 and antenna apertures 540 and 550 may be utilized. In either example embodiment, antenna feed termination 560 may couple, or partially couple, the radiating element of 560 with aperture 540 or 550 depending on the alignment for the usage mode configuration.

The radiating element of antenna feed 560 may be fed with an RF signal from a wireless adapter using coaxial cabling or similar connection through the hinge and along the shaft or carrier to the radiating element. In the laptop usage mode configuration of FIG. 5A, sliding alignment of antenna feed 560 with antenna aperture 2 540 may provide for a transmission pattern 552 as shown in FIG. 5A. In some embodiments, a plurality of antenna feeds 560 may be used to align during rotation each with its own set of antenna apertures such as 540 and 550 such as for MIMO operation. The sets of antenna apertures may be spaced apart along hinge 530 in some example embodiments. Further, the antenna apertures may be offset between the plurality of antenna feeds 560 such that two or more antenna aperture positions may be provided for between the antenna feeds 560 around the axis of rotation in any given usage mode configuration position in some embodiments. For example, in a laptop configuration, one antenna feed 560 may have a slightly offset antenna aperture 540 relative to the antenna aperture in laptop configuration mode for a second antenna feed (not shown). In this way, between antenna feeds 560, plural options for antenna radiation patterns 552 may be available. For example, one aperture position for a first antenna feed 560 may be better for laptop usage mode position at 90-110 degrees while a second antenna feed may have an aperture position better suited for 110-140 degree angles. Similar variability between antenna feeds may be used with other hinge positions corresponding to other antenna usage mode configuration ranges.

FIG. 5B shows the convertible information handling system with hinge 530 rotated into a tablet usage mode configuration. In the example embodiment, hinge 530 is rotated to approximately 360 degrees such that first display housing 510 is rotated fully around second housing 520. Hinge 530 is operatively connected to a shaft or carrier 532 which projects into an outer barrel 534. Outer barrel 534 may be made of a conductive material and have a plurality of antenna apertures 540 and 550 as described. Shaft or carrier 532 may be made of plastic or another non-conductive material in some embodiments and have radiating element of antenna feed termination 560 mounted thereon for rotation by shaft or carrier 532. Antenna feed 560 may rotate within hinge cavity of outer barrel 534. As hinge 530 rotates, the radiating element of antenna feed 560 slidingly rotates within outer barrel 534 from antenna aperture 540 to antenna aperture 550 when rotated to tablet usage mode configuration. In an example embodiment, the antenna feed 560 radiating termination portion may lock into a position aligned with antenna aperture 550 by engaging locking alignment guide such as a notch or end stop for rotation of shaft or carrier 532 or for hinge 530 with respect to outer barrel 534. Such a feature, or other locking features, may temporarily lock the antenna feed 560 into alignment for tablet usage mode configuration at a hinge angle position of approximately 360 degrees or another hinge angle. It is understood that the locking antenna alignment guide may lock into position with varying levels of firmness depending on desired level of position hold versus reconfigurability ease.

FIG. 5B also shows that antenna aperture 550 provides for an adapted transmission radiation pattern 552. The adapted transmission radiation pattern 552 from antenna aperture 550 in FIG. 5B has directivity towards the display screen housing side 510 of the convertible information handling system. As such, directivity of the transmission radiation pattern 552 may be made away from the user, such as a lap, upon which a second housing 530 may rest. SAR transmission power measurements may be conducted on the second housing side 530 to determine potential exposure to a user who may contact that side of a convertible information handling system operating in laptop usage mode configuration. Thus, directivity due to the adaptation of slidingly aligning the antenna feed 560 with antenna aperture 550 during rotation and may shift the antenna transmission pattern away from potential user contact which may help with meeting SAR regulatory requirements without requiring power cutback or may lessen the amount of power cutback necessary.

In at least one example embodiment, a single antenna aperture may be used, such as 540 or 550 and the outer barrel 534 may rotate relative to hinge 530 but at different rotation ratios. In one example, both the aperture 540 or 550 and barrel 534 may rotate in a 1:1 ratio with hinge 530 rotation. In other embodiments, a different rotation ratio may be used. The antenna feed 560 may also rotate with the aperture 540 or 550 when outer barrel 534 rotates with hinge 530. Accordingly, with each clockwise or counter-clockwise hinge rotation, the antenna aperture rotation 540 is adjusted and may rotate further or less relative to the hinge rotation amount. In this way, the location of antenna aperture 540 as rotated in a clockwise or counterclockwise direction is adapted as to location and position of the antenna transmission pattern 552 for each usage mode configuration hinge angle position. Such as rotation of the outer barrel and antenna aperture position relative to usage mode configuration may be seen in a variation of FIGS. 4A-4C and as described in part above.

FIG. 5C shows the convertible information handling system with hinge 530 rotated into a closed usage mode configuration. In the example embodiment, hinge 530 is rotated to approximately 0 degrees such that first display housing 510 is rotated fully around second housing 520 in the opposite rotation direction to close the display screen to second housing 520. As described, hinge 530 is operatively connected to a shaft or carrier 532 which projects into an outer barrel 534. Outer barrel 534 may be made of a conductive material and have a plurality of antenna apertures 540 and 550 as described. Shaft or carrier 532 may be made of plastic or another non-conductive material in some embodiments and have radiating element of antenna feed termination 560 mounted thereon for rotation by shaft or carrier 532. Antenna feed 560 may rotate within hinge cavity of outer barrel 534. As hinge 530 rotates, the radiating element of antenna feed 560 slidingly rotates within outer barrel 534 from antenna aperture 2 540 to antenna aperture 1 550 when rotated to closed clamshell usage mode configuration. Antenna aperture 550 may be shared between tablet usage mode and closed usage mode. In an example embodiment, the antenna feed 560 radiating termination portion may lock into a position aligned with antenna aperture 550 by engaging a notch or end stop at the opposite end for rotation of shaft or carrier 532 or for hinge 530 with respect to outer barrel 534. Such a feature, or other locking features, may temporarily lock the antenna feed 560 into alignment for closed clamshell usage mode configuration at a hinge angle position of approximately 0 degrees or another hinge angle.

FIG. 5B shows that antenna aperture 550 provides for an adapted transmission radiation pattern 552 toward display housing side 510 in an embodiment. The adapted transmission radiation pattern 552 from antenna aperture 550 in FIG. 5C has directivity towards the second housing side 520 of the convertible information handling system in a closed usage mode position in another embodiment. The outer barrel 534 may rotate relative to first display housing 510 and second housing 520 to provide for differing position of antenna apterture 550 in some example embodiments or may be fixed with respect to either the display housing 510 or second housing 520 and rotate to differing positions upon reconfiguration. Thus, directivity due to the adaptation of slidingly aligning the antenna feed 560 with antenna aperture 550 may shift the antenna transmission pattern toward the bottom second housing 520 of the convertible information handling system in either example embodiment during reconfiguration to closed usage mode configuration.

Figure 6:
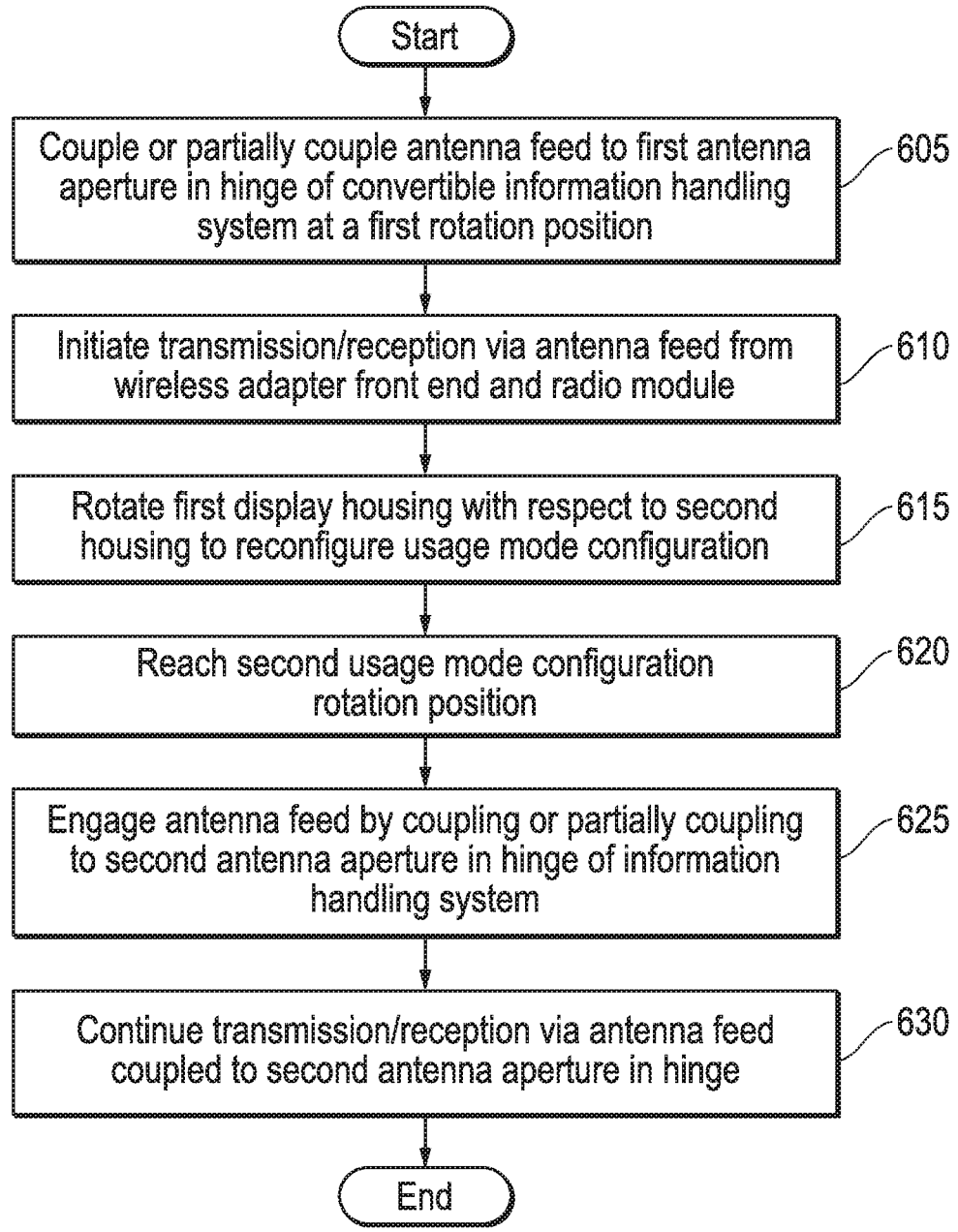
FIG. 6 is a flow diagram illustrating a method of operating a mobile information handling system hinge mechanism with the living antenna aperture in changing configuration according to an embodiment of the present disclosure.

FIG. 6 shows a method for operating a living antenna aperture implementation in a hinge mechanism of a convertible information handling system according to an embodiment of the present disclosure. At 605, at least one antenna feed is coupled to, or partially coupled to, an antenna aperture residing in the hinge mechanism of a convertible information handling system. The antenna feed is a fixed antenna feed located within the hinge cavity and operatively connected to the wireless adapter of the convertible information handling system. In some embodiments, the wireless adapter may operate in one or both of the first display housing or second housing hinged by the hinge mechanism of the embodiments herein. Further, the hinge mechanism may also provide for operative connectivity for display devices, display processors, CPU, power, audio connections, orientation sensors, proximity detectors, touchscreen sensors, camera systems, and other components distributed across the housings of the convertible information handling systems as described in embodiments herein.

At 610, the wireless adapter of the information handling system may initiate transmission or reception of a wireless signal via the antenna feed located in the cavity of the hinge mechanism. The convertible information handling system may be in a first usage mode configuration which may involve a specific range of rotation position of the hinge mechanism. In an example embodiment, the first rotation position of the hinge may be due to a laptop usage mode configuration for utilization of the first display housing with respect to the second housing. In the current hinge rotation position, the antenna feed is coupled or partially coupled to the first antenna aperture of a set of antenna apertures in the hinge mechanism for the antenna feed to couple to as the hinge rotates. The coupling or partial coupling with the first antenna aperture in the hinge will yield an antenna transmission pattern suitable for the first usage mode configuration. For example, the first antenna aperture may couple with the antenna feed to yield an antenna transmission pattern suitable for laptop usage mode in an example embodiment when the first antenna aperture is coupled to the antenna feed in the cavity of the hinge mechanism.

Proceeding to 615, the first display housing may be rotated with respect to the second housing of the convertible information handling system. In an example embodiment, the first housing and the second housing may be rotated around an axis of rotation of the hinge of the convertible information handling system. Rotation around the axis of the hinge may be done by a user, for example, wishing to put the convertible information handling system into a different usage mode configuration. For example, a user may rotate the first display housing with respect to the second housing to reconfigure the convertible information handling system from a laptop usage mode configuration to a tablet usage mode configuration in one example embodiment. The user may flip the first display screen housing around behind the second housing, such as one supporting a keyboard, such that the hinge position at or near a 340-360 degree rotation position for a tablet usage mode configuration in an embodiment. This is relative to a closed clamshell usage mode configuration position at 0 degrees in an example embodiment. In this way, the first display screen housing may provide for the display screen facing a user with the keyboard second housing facing away from the user so that the convertible information handling system may be used as a tablet.

At 620, the hinge of the convertible information handling system may reach a hinge position corresponding to the desired usage mode configuration. In an example embodiment, the hinge position may be rotated from a laptop usage mode configuration hinge position such as between 90 degree or 140 degree to a 340-360 degree tablet usage mode configuration hinge position in an example embodiment. A plurality of usage mode configurations may be available to the convertible information handling system such that several hinge position ranges may correspond to the second usage mode configuration rotation position.

Upon reaching the second usage mode configuration rotation position at 620, the hinge mechanism is rotated along with the antenna feed to couple the antenna feed at 625 with a second antenna aperture located on the hinge. As the hinge rotates between usage mode positions, the antenna feed in the hinge cavity is rotated with the hinge mechanism and slidingly couples a next antenna aperture on the hinge. Depending on the rotation position of the hinge, the antenna feed may be fully or partially coupled to the second antenna aperture in the second usage mode configuration position. In example embodiments, one or more locking alignment guides may align the antenna feed with one or more of the antenna apertures available for the hinge. If further embodiments, two or more antenna feeds may be set to align with two or more corresponding sets of antenna apertures on the hinge system. In some aspects, the plural antenna aperture sets may be offset with respect to one another to provide additional antenna radiation pattern options or options with respect to signal quality levels as between plural, parallel antenna feeds.

Proceeding to 630, the convertible information handling system may continue to transceive via the antenna feed at the second usage mode configuration position. This transmission and reception will be, in part at least, via the coupled second aperture in the hinge. The second hinge antenna aperture provides for an adapted transmission pattern for the second usage mode configuration. The adapted transmission pattern may reduce potential SAR exposure levels in the second usage configuration mode in some embodiments. The adapted transmission pattern may reduce interference levels or improve signal quality in the second usage configuration mode in some embodiments.

It is understood that the methods and concepts described in the algorithm above for FIG. 6 may be performed in any sequence or steps may be performed simultaneously in some embodiments. It is also understood that in some varied embodiments certain steps may not be performed at all or additional steps not recited in the above figures may be performed. It is also contemplated that variations on the methods described herein may also be combined with portions of any other embodiments in the present disclosure to form a variety of additional embodiments.

In some embodiments, dedicated hardware implementations such as application specific integrated circuits, programmable logic arrays and other hardware devices can be constructed to implement one or more of the methods described herein or portions of one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as an Intel® Core™ or ARM® RISC brand processors, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A hinge for an information handling system comprising:
    an antenna feed in an outer barrel cavity slidingly alignable to a plurality of antenna apertures in the hinge through rotation of the hinge;
    the antenna feed connected to a wireless adapter for communicating on a wireless link;
    the hinge operatively coupling a display housing and a second housing of a convertible information handling system;
    the antenna feed slidingly aligning with a first antenna aperture in the hinge in a first rotation position of the display housing around the hinge with respect to the second housing reflecting a first usage mode configuration; and
    the antenna feed slidingly aligning with a second antenna aperture in the hinge when rotated to a second rotation position of the display housing around the hinge with respect to the second housing reflecting a second usage mode configuration,
    wherein switching alignment between the first antenna aperture and the second antenna aperture in the hinge adjusts the antenna radiation pattern location of the convertible information handling system.

2. The hinge of claim 1 wherein the second housing supports a keyboard of the convertible information handling system.

3. The hinge of claim 1, further comprising:
    the antenna feed operatively connected to a wireless adapter of the convertible information handling system for transceiving a wireless signal.

4. The hinge of claim 1, further comprising:
    a second antenna feed in the hinge cavity slidingly alignable to a second plurality of antenna apertures in the hinge through rotation of the hinge.

5. The wireless adapter front end of claim 1 wherein as the hinge is rotated, the switched alignment between coupling to the first antenna aperture and coupling to the second antenna aperture in the hinge adapts the antenna radiation pattern orientation depending on a laptop or tablet configuration.

6. A hinge for an information handling system comprising:
    an antenna feed operatively connected to a wireless adapter for communicating on a wireless link in a barrel cavity slidingly alignable with a plurality of antenna apertures;
    a hinge pivoting between a leaf-connected display housing and a second leaf-connected housing;
    the hinge operable to provide for rotation of the leaf-connected display housing around the hinge with respect to the second leaf-connected housing between usage mode configurations;
    the antenna feed terminating in the hinge, wherein the hinge is rotatably movable with respect to the plurality of antenna apertures; and
    the hinge including the plurality of antenna apertures each alignable to the antenna feed depending on the rotation orientation of the leaf-connected display housing around the hinge with respect to the second leaf-connected housing to couple to the antenna feed in the usage mode configuration positions to switching alignment between antenna apertures in the hinge and adjust the antenna radiation pattern location of the convertible information handling system,
    where the antenna feed slidingly aligning with a first antenna aperture in the hinge in a first rotation position of the leaf-connected display housing around the hinge with respect to the second leaf-connected housing reflecting a first usage mode configuration, and the antenna feed slidingly aligning with a second antenna aperture in the hinge when rotated to a second rotation position of the leaf-connected display housing around the hinge with respect to the second leaf-connected housing reflecting a second usage mode configuration.

7. The hinge of claim 6 wherein the leaf-connected display housing supports a display device and the second leaf-connected housing supports a keyboard.

8. The hinge of claim 6 wherein a flexible display device is supported across both the leaf-connected display housing and the second leaf-connected housing.

9. The hinge of claim 6 wherein the plurality of antenna apertures each align to terminate the antenna feed for a usage mode configuration position as the leaf-connected display housing is rotated around the hinge with respect to the second leaf-connected housing to provide variable radiation pattern modes.

10. The hinge of claim 6 wherein the radiation pattern hot spots during antenna transmission are varied with respect to the information handling system as the leaf-connected display housing is rotated around the hinge with respect to the second leaf-connected housing.

11. The hinge of claim 10 wherein the radiation pattern hot spots are deflected with respect to the second leaf-connected housing when the hinge is rotated to a tablet usage mode configuration to maintain specific absorption rate (SAR) transmission power limits along the second leaf-connected housing.

12. The hinge of claim 6, further comprising:
    a second feed terminating in the hinge, wherein the hinge is movable with respect to a second plurality of antenna apertures each alignable to the second antenna feed.

13. A method comprising:
    rotating a display housing with respect to the second housing around a hinge of a convertible information handling system with an antenna feed in the hinge slidingly alignable with a plurality of antenna apertures;

coupling the antenna feed in an outer barrel cavity to a first antenna aperture of the hinge in a first usage mode configuration of the convertible information handling system;

coupling the antenna feed in the outer barrel cavity to a second antenna aperture of the hinge in a second usage mode configuration of the convertible information handling system upon rotation to the second usage mode configuration; and adjusting the antenna radiation pattern and specific absorption rate hotspot location between rotation of the first and second usage mode configurations depending on the rotation orientation of the display housing around the hinge with respect to the second housing to couple to the antenna feed in the usage mode configuration positions to switching alignment between antenna apertures in the hinge and adjust the antenna radiation pattern location of the convertible information handling system.

14. The method of claim 13, further comprising:
coupling the antenna feed in the outer barrel cavity to a third antenna aperture in a third usage mode configuration of the convertible information handling system upon rotation to the third usage mode configuration.

15. The method of claim 13, wherein the plurality of concurrently operating wireless links on the information handling system includes at least one Wi-Fi wireless link.

16. The method of claim 13, further comprising:
coupling a second antenna feed in a second outer barrel cavity to each of a plurality of second antenna feed antenna apertures on the hinge as the convertible information handling system rotates through a plurality of usage mode configurations;

adjusting the antenna radiation pattern and specific absorption rate hotspot location for the transmission from the second antenna feed via the plurality of second antenna feed antenna apertures.

17. The method of claim 13 wherein the first usage mode configuration is a laptop usage mode configuration of the convertible information handling system.

18. The method of claim 13 wherein the second usage mode configuration is a tablet usage mode configuration of the convertible information handling system.

19. The method of claim 18 wherein the second antenna aperture adjusts the antenna radiation pattern and specific absorption rate hotspot location for the tablet usage mode configuration to the display housing side of the convertible information handling system to avoid contact with a user handling convertible information handling system.

20. The method of claim 13, further comprising:
slidingly aligning the antenna feed in the outer barrel cavity with the second antenna aperture of the hinge via a locking alignment guide and as the convertible information handling system rotates around the hinge from the first usage mode configuration to the second usage mode configuration to couple the antenna feed to the second antenna aperture.

\* \* \* \* \*